United States Patent

[11] 3,527,191

| [72] | Inventors | Ralph E. Kawecki<br>92 Pinehurst Ave., New Britain, Conn.<br>06053; Carl Zimmitti, 47 Sbona Road,<br>Kensington, Conn. 06037 |
|---|---|---|
| [21] | Appl. No. | 780,379 |
| [22] | Filed | Dec. 2, 1968 |
| [45] | Patented | Sept. 8, 1970 |

| [54] | AUTOMATIC PET FEEDING AND WATERING DEVICE<br>9 Claims, 3 Drawing Figs. | |
|---|---|---|
| [52] | U.S. Cl. | 119/51.11,<br>119/51.5 |
| [51] | Int. Cl. | A01k 5/00,<br>A01k 7/00 |
| [50] | Field of Search | 119/51.11,<br>51.5, 56 |

[56] References Cited
UNITED STATES PATENTS

| 1,207,938 | 12/1916 | Kuxmann | 119/51.5 |
| 2,701,548 | 2/1955 | Wolfe | 119/51.5 |
| 3,171,385 | 3/1965 | Decker et al. | 119/51.11 |
| 3,196,835 | 7/1965 | Bergevin | 119/51.11 |

*Primary Examiner*—Hugh R. Chamblee
*Attorney*—Gustave Miller

ABSTRACT: This invention is an automatic, stable, pet feeding and watering device that dispenses food and water at predetermined intervals, and that is very stable against being accidentally overturned by the feeding pet. It may be made in any size for any type of pet, whether a cat, dog, horse, or even small enough to be put inside a bird cage. It consists of a feed hopper, a water tank and a timed motor for feeding food and water from the hopper to a food pan and from the tank to a watering trough, the hopper having plane sides tapering inwardly and downwardly, with supporting legs at each corner, and the watering trough and food pans are each placed between two adjacent legs. Also, heating means may be present, actuated by a thermostat when the temperature drops.

INVENTORS
Ralph E. Kawecki
Carl Zimmitti
BY Gustave Miller
ATTORNEY

3,527,191

AUTOMATIC PET FEEDING AND WATERING DEVICE

OBJECTS OF THE INVENTION

It is an object of this invention to provide a stable timed food and water dispenser for pets having a capacity to automatically feed and water a pet for a number of days, particularly when the pet owner may be unavailable, as when being away over a weekend or on a vacation.

A further object of this invention is to provide an automatic, stable, feeding and watering device which may be made in any size suitable for a small or a large pet, such as a cat or dog, or even a horse, or placed inside a bird cage to feed a canary or a parrot, the size of the device being related to the size of pet it is to feed.

Still a further object of this invention is to provide a device which is inherently stable, and not liable to move or turn over when nudged by the feeding or drinking pet.

A further object of this invention is to provide a device for automatically feeding and watering a pet which may be located in the pet's usual environment, which may feed and water the pet for several days at a time, and which may be used both when the pet owner is away, but also when the owner is at home, to automatically feed and water the pet at predetermined intervals, one or more times a day with a capacity as desired, thereby relieving the pet owner of the problem of regularly feeding the pet, and reducing his problem to that of replenishing the food and water in the device at much greater intervals.

SUMMARY OF THE INVENTION

This invention consists of a food dispensing hopper supported on legs extending from each inwardly tapering corner of the hopper. A food agitator and conveying worm shaft is supported in the hopper for conveying the food therein to a chute at one side leading to at least one food pan between two adjacent legs. A closed water tank is secured between two other adjacent legs, with a downward discharge pipe beneath which a water trough is placed, the pipe extending below the trough sides but above its bottom, the end of the pipe determining the water level in the trough. A timed motor rotates the food agitator shaft, and through a pair of cooperating bevel gears, a second shaft operates a water control shaft in the tank downwardly extending pipe, for also dispensing the water simultaneously with the food. Depending on the number of sides of the hopper, more than one food pan may be provided, one between each adjacent pair of legs except the pair between which the water trough is placed.

BRIEF DESCRIPTION OF THE FIGURES

With the above and related objects in view, this invention consists in the details of construction and combination of parts, as will be more fully understood from the following description, when read in conjunction with the accompanying drawing, in which.

DESCRIPTION OF INVENTION

Figure 1:
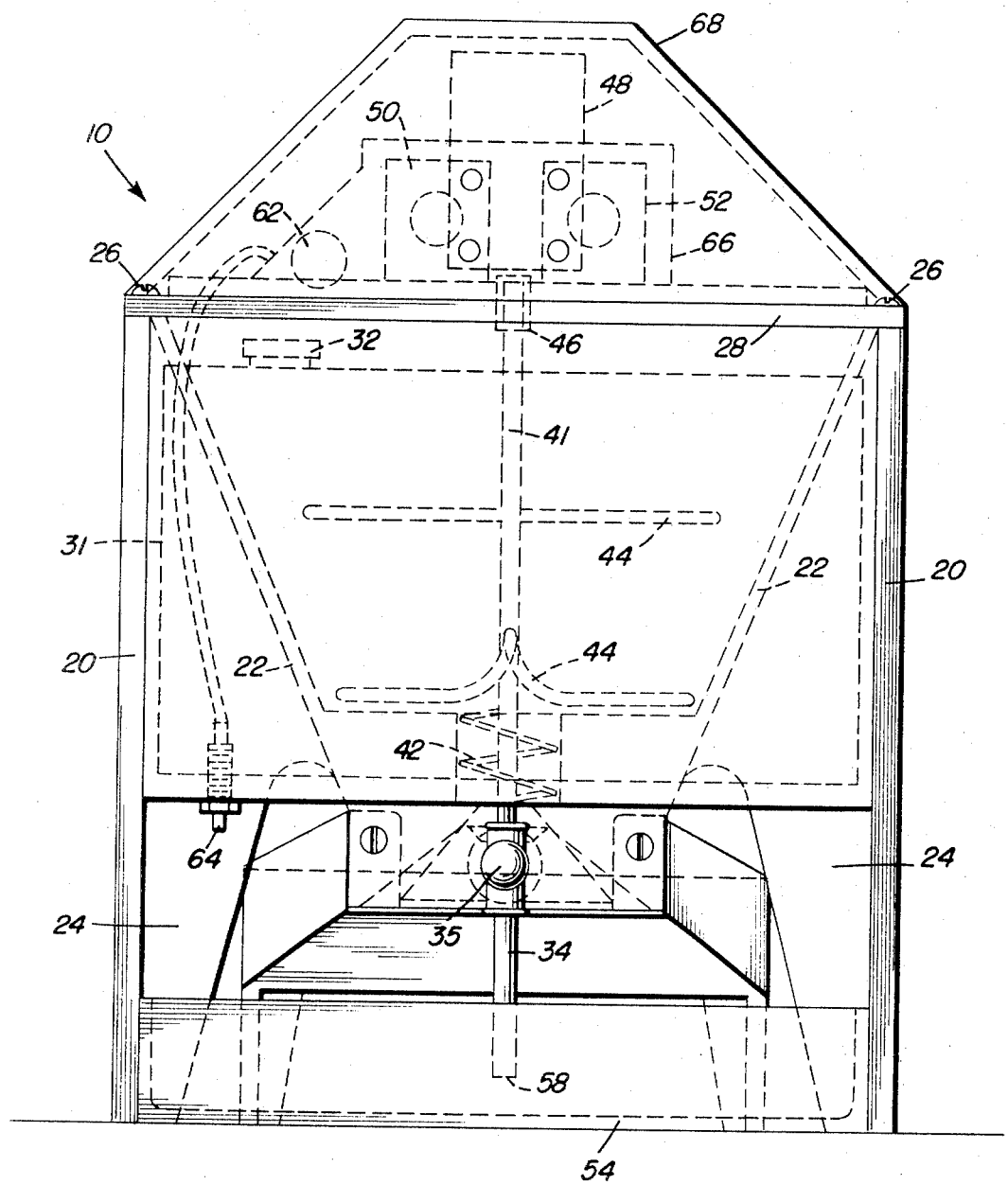
FIG. 1 is a side elevational view of the device, looking at the watering end.
Figure 2:
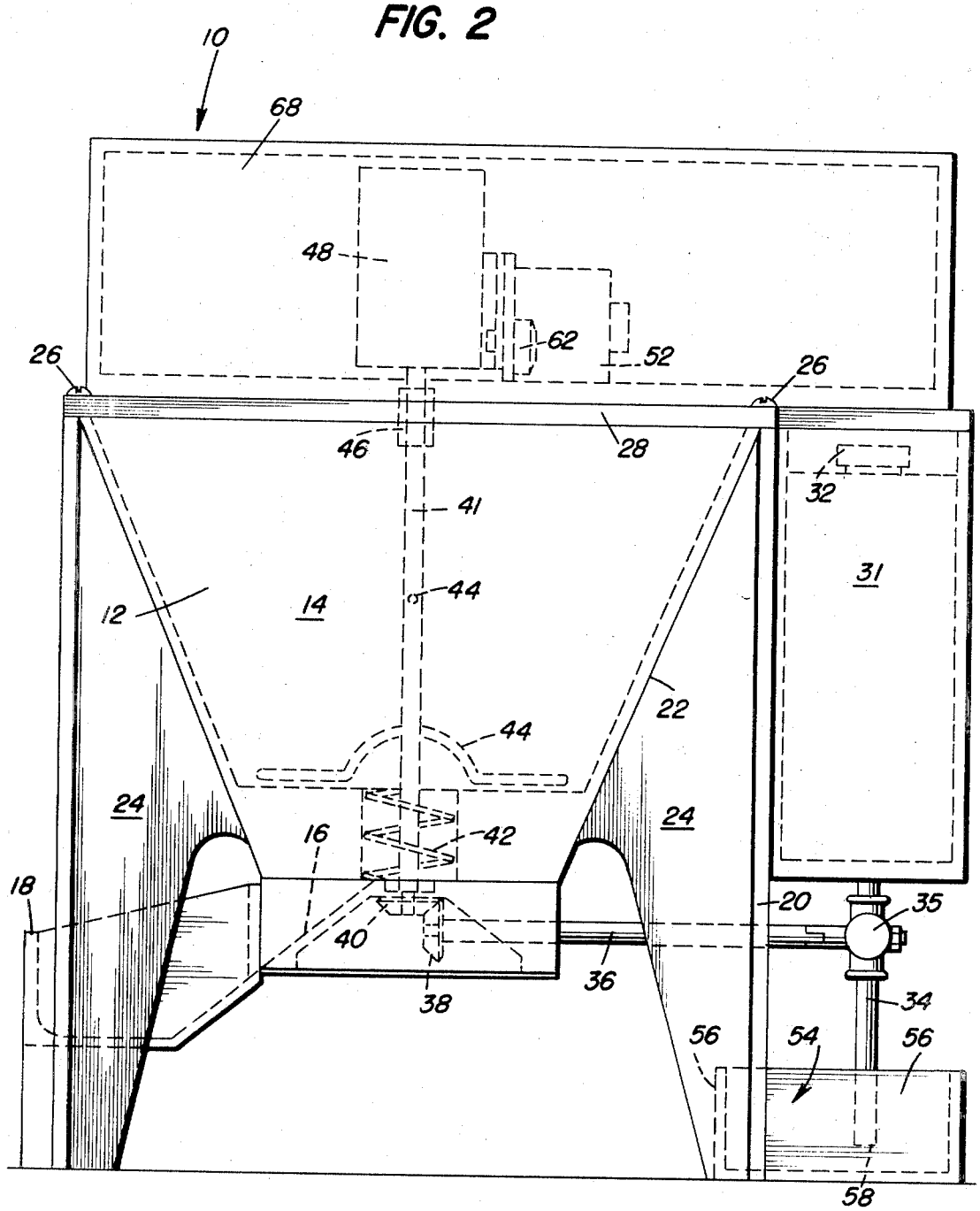
FIG. 2 is a side elevation, looking at one feeding pan side.
Figure 3:
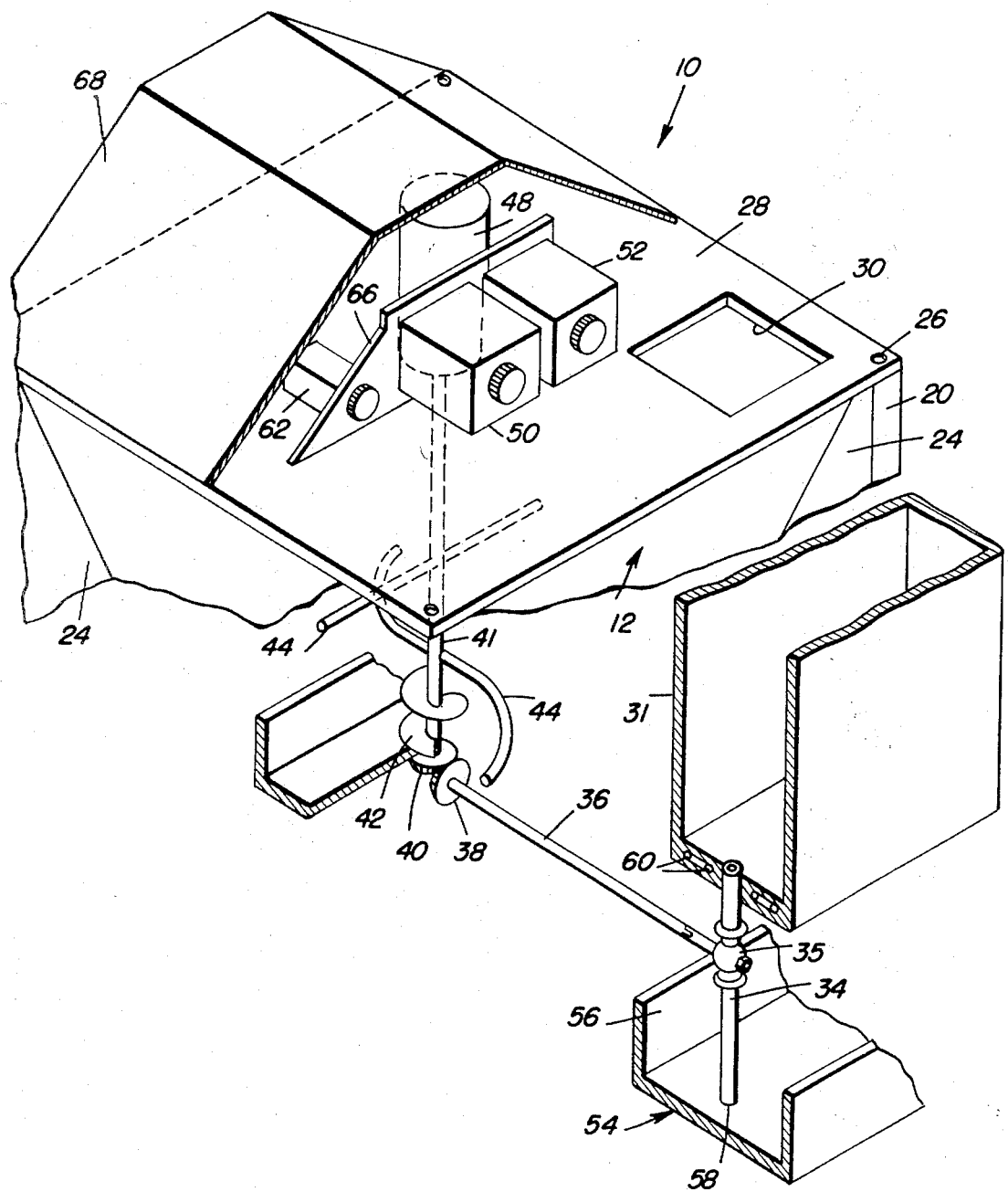
FIG. 3 is a perspective fragmentary view, with parts broken away.

There is shown at 10 the stable, automatic pet feeding and watering device of this invention. The device 10 consists of a hopper 12 of regular polygon shape in cross section, having downwardly, inwardly tapering plane sides 14 and open at its bottom, discharging on one or more chutes 16 at the bottom end of which a food pan 18 is located. The hopper 12 shown is four-sided, but obviously may have three, five or more sides, depending on its size and desired capacity for one or more than one food hopper discharge chute 16 and feed pans 18. A supporting leg 20 is located at each corner of the hopper 12, a total of four legs being here provided, each leg 20 being secured to a corner 22 of the hopper by a bracing web 24. As a result of such web and leg construction, the whole device is very stable, and unlikely to be moved or overturned if nudged by the feeding or drinking pet. Removably secured over the top of the hopper 12, as by stud bolts 26, is a hopper cover 28, a trap door opening 30 being provided therein through which food can be placed into the hopper 12. Between one pair of adjacent legs 20 there is mounted a closed water tank 31 having a removable cap 32 at its top for replenishing the water supply. At its bottom, a water discharge pipe 34 depends downwardly, having a water control valve 35 intermediate thereof to which is secured in operating shaft 36 extending horizontally and terminating in a bevel gear 38 at its other end just below the hopper 12.

This bevel gear 38 meshes with a bevel gear 40 at the bottom end of a food agitating and discharge shaft 41 on which is mounted a conveyor worm or screw 42 just above the one or more chutes 16. Above the worm 42 are a pair of food agitator bars 44 so as to agitate or stir the food and permit it to discharge at the open bottom of the hopper 12 which, of course, is closed by the one or more chutes 16.

The food agitator shaft 41 is connected by a coupler 46 to a motor 48 supported on the hopper cover 28, the coupler 46 extending down through the cover 28. The operation of the motor 48 is controlled by a clock 50 and a timer 52. The motor 48, clock 50 and timer 52 are preferably electrically operated, usually by electricity from a power line through suitable conductors, (not shown) but may be battery operated. Likewise, they may be spring operated, if no source of electricity is to be available in the desired feeding location. Below the discharge pipe 34 is placed a water pan 54, the sides 56 of the water pan 54 extending above the bottom end 58 of pipe 34, and inasmuch as the water tank 31 is kept closed by its cap 32, the partial vacuum created in the tank 31 above the water cooperating with atmospheric pressure prevents the water level in the water pan from rising appreciably above the bottom end 58 of pipe 34. Electrical heating strips 60 in the bottom of the water tank 31 keep the water from freezing if exposed to freezing temperatures in the feeding location, such heater strips 60 being controlled by a thermostat 62 controlled by a sensor 64. Battery or power line electricity must be provided for the heater strips 60, if in use, if the clock 50 and timer 52 are spring operated.

The clock 50, timer 52 and thermostat 62 are supported on a supporting plate 66 on the hopper cover 28. A roof 68 over the cover 28 and the clock 50, timer 52 and thermostat 62 is removably provided on the hopper cover 28 in any suitable manner, as, for instance, by being hinged thereto at one end and snap fastened at the other end, so as to permit ready access to the food trap door opening 30 for ready replenishment of the food in the hopper 12.

OPERATION OF THE INVENTION

In operation, the device is located in any suitable location where it is accessible to the pet or pets to be fed and watered, the size being appropriate to the size of the pet. The roof 68 is lifted to permit food to be placed in the hopper 14 through opening 30, and the water tank 31 is filled after temporarily removing the cap 32. The clock 50 and timer 52 are set to cause the motor 48 to operate at predetermined desired intervals, once a day in the case of a dog pet. If spring operated, the springs will be wound at the same time.

When the clock 50 and timer 52 initiates operation of the motor 48, the shafts 41 and 36 are rotated, the food in the hopper is agitated or stirred by the bars 44, thus making sure that the food is loose and not tightly packed in the hopper, permitting the conveyor worm or screw 42 to deliver food on the chute 16 down to the food pan 18. Simultaneously, the shaft 26 opens the water control valve 35 to discharge water into the water pan 54 until the water level reaches the bottom end 58 of the pipe 34, where it stops due to atmospheric pressure, even though the valve may be open. The timer 52 is set to permit operation of the motor for a predetermined period of time, enough to deliver just the right amount of food to the feed pan 18. The clock 50 then keeps the timer inactive until the next preset feeding period.

In the drawings, like numbers refer to like parts, and for the purposes of explication, set forth below are the numbered parts of the improved Automatic Pet Feeding And Watering Device:

| | |
|---|---|
| 10 | automatic, stable, pet feeding and watering device |
| 12 | hopper |
| 14 | plane sides of hopper 12 |
| 16 | food discharge chute at bottom of open bottomed hopper 12 |
| 18 | food pan between two adjacent legs 20 |
| 20 | legs |
| 22 | inwardly sloping corners of 12 |
| 24 | bracing webs from corners 22 to legs 20 |
| 26 | cover securing stud bolts |
| 28 | hopper cover |
| 30 | trap door opening in cover 28 |
| 31 | water tank |
| 32 | water tank cap |
| 34 | water discharge pipe |
| 35 | water control valve |
| 36 | operating shaft for 35 |
| 38 | bevel gear on 36 |
| 40 | bevel gear on end of 41 |
| 41 | operating shaft for food agitator bars 44 and worm 42 |
| 42 | conveyor worm or screw on 41 |
| 44 | food agitator bars |
| 46 | coupler on 41 to motor 48 |
| 48 | motor |
| 50 | clock |
| 52 | timer |
| 54 | water trough |
| 56 | sides of 54 |
| 58 | bottom end of pipe 34 |
| 60 | electrical heater strips in tank 31 |
| 62 | thermostat |
| 64 | sensor for 62 |
| 66 | supporting plate for 50, 52 and 62 |
| 68 | roof over hopper cover 28 |

Although this invention has been described in considerable detail, such description is intended as being illustrative rather than limiting, since the invention may be variously embodied.

We claim:

1. An automatic pet feeding and watering device 10 comprising a downwardly, inwardly tapering food hopper 12, said hopper having a regular polygon shape in horizontal cross-section, a supporting leg 20 extending from each of a plurality of the polygon corners 22 providing a stable support therefor, a closed water tank 31 supported between two adjacent legs 20 above the leg bottom ends, a water discharge pipe 34 extending down from the bottom of said closed water tank 31, a water trough 54 below said tank 31 into which said tank discharge pipe 34 extends, said pipe 34 ending 58 a distance above the bottom of said water trough 54 limiting the water level in said trough to approximately the bottom end 58 of said pipe 34, at least one discharge chute 16 connected to the bottom end of said hopper 12, a food pan 18 supported between two adjacent legs 20 in the path of said hopper discharge chute 16, a food discharge shaft 41 extending into said hopper 12, a timed motor means 48, 50, 52 operatively connected to said food shaft 41, a control valve 35 in said water tank 31 discharge pipe 34, and means operatively connecting said control valve 35 to said timed motor means 48, 50, 52.

2. The device of claim 1, said food shaft 41 comprising a shaft 41 operatively connected at one end to said timed motor means 50, 52, agitator bar means 44 secured on said shaft 41, and a food conveyor worm 42 on said shaft 41 adjacent its bottom end for conveying agitated food from said hopper 12 to said discharge chute 16.

3. The device of claim 1, said means operatively connecting said control valve to said timed motor means comprising a shaft 36 connected to said control valve 35 at one end, and gear means 38, 40 operatively connecting the other end of said control valve shaft 36 to the bottom end of said food discharge shaft 41.

4. The device of claim 1, said timed motor means comprising a clock 50, a motor 48 to which said food discharge shaft 41 is operatively connected, and a timer 52 operatively connected to said motor 48 and clock 50 controlling said motor 48 to operate at predeterminable intervals for predetermined periods of time.

5. The device of claim 4, said motor 48 being an electrical motor, said timer 52 being an electrical timer, and said clock 50 being an electrical clock.

6. The device of claim 1, an electrical water warmer 60 in said water tank 31 and thermostat means 62 operatively connected to said electrical water warmer 60 to maintain the water above the freezing point.

7. The device of claim 1, and a cover 28 on said hopper 14 having a food admitting opening 30 therethrough, said timed motor means 48, 50, 52 being supported on said cover 28, and a removable roof 68 on said cover 28 protecting said timed motor means 48, 50, 52.

8. The device of claim 2, said means operatively connecting said control valve to said timed motor means comprising a shaft 36 connected to said control valve 35 at one end, and gear means 38, 40 operatively connecting the other end of said control valve shaft 36 to the bottom end of said food discharge shaft 41, said timed motor means comprising a clock 50, a motor 48 to which said food discharge shaft 41 is operatively connected, and a timer 52 operatively connected to said motor 48 and clock 50 controlling said motor 48 to operate at predeterminable intervals for predetermined periods of time, and a cover 28 on said hopper 14 having a food admitting opening 30 therethrough, said timed motor means 48, 50, 52 being supported on said cover 28, and a removable roof 68 on said cover 28 protecting said timed motor means 48, 50, 52.

9. The device of claim 8, said motor 48 being an electrical motor, said timer 52 being an electrical timer, and said clock 50 being an electrical clock, an electrical water warmer 60 in said water tank 31 and thermostat means 62 operatively connected to said electrical water warmer 60 to maintain the water above the freezing point.